(12) United States Patent
Nicholas et al.

(10) Patent No.: US 7,118,092 B2
(45) Date of Patent: Oct. 10, 2006

(54) METHOD AND APPARATUS FOR ASSEMBLING A VANE-TYPE VALVE

(75) Inventors: Frank A. Nicholas, W. Henrietta, NY (US); Ashish Singh, Rochester, NY (US); Curtis D. Lamb, Scottsville, NY (US); Paul H. Williams, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 28 days.

(21) Appl. No.: 11/074,960

(22) Filed: Mar. 8, 2005

(65) Prior Publication Data

US 2006/0202148 A1 Sep. 14, 2006

(51) Int. Cl.
*F16K 1/22* (2006.01)

(52) U.S. Cl. ............... 251/305; 137/15.25; 137/315.22

(58) Field of Classification Search ................ 251/305, 251/308; 123/337; 137/15.25, 315.22, 315.24
See application file for complete search history.

(56) References Cited

U.S. PATENT DOCUMENTS

| 3,774,879 | A | * | 11/1973 | Zink ........................... 251/303 |
| 5,875,758 | A | * | 3/1999 | Fujita ........................... 123/336 |
| 6,520,198 | B1 | * | 2/2003 | Nishijima et al. ........ 137/15.18 |

* cited by examiner

*Primary Examiner*—Edward K. Look
*Assistant Examiner*—John K. Fristoe, Jr.
(74) *Attorney, Agent, or Firm*—Paul L. Marshall

(57) ABSTRACT

A vane-type throttle valve assembly including a body having a passage therethrough and a pivotable shaft transverse of the passage and supporting a vane for variably restricting the flow of material through the passage. The shaft is disposed in opposing bores in the valve body. Each bore includes an access slot. The valve is assembled by inserting an integrated shaft and vane into the passage, engaging the ends of the shaft into the access slots, and translating the shaft ends in the access slots until the ends of the shaft are positioned in the bores. The shaft is retained in the bores by bushings inserted from outside the valve body. In a currently preferred embodiment, the access slots are formed over an angle from an axis of the bores, and the shaft ends are entered into the bores by rotating the shaft and vane about the passage axis.

11 Claims, 5 Drawing Sheets

US 7,118,092 B2

METHOD AND APPARATUS FOR ASSEMBLING A VANE-TYPE VALVE

TECHNICAL FIELD

The present invention relates to vane-type valves, also referred to herein as "butterfly" or "throttle" valves; more particularly to a method and apparatus for forming and assembling a vane-type valve.

BACKGROUND OF THE INVENTION

Vane-type valves are used in a wide variety of applications, for example, as throttle valves for internal combustion engines. In a typical vane valve assembly, a valve body includes a passage, which may be cylindrical although not necessarily, for conveyance of a material such as a gas or liquid. A pivotable shaft is disposed in the valve body and extends across the passage. A vane, also known as a butterfly or throttle, is mounted on the shaft and can partially- to fully-close the passage by rotation of the pivotable shaft to variably control the rate of flow of material through the valve body.

Assembling a vane valve presents well-known logistical problems. For example, in an older prior art valve, the shaft without the vane is mounted into bushings in bores in the body, and the vane is subsequently attached to the shaft. Because the shaft is preferably round in those portions within the bushings, the shaft typically must be either slotted or flatted within the passage to receive the vane. Further, the vane typically is attached to the shaft by screwed fasteners which require anti-rotation devices such as lock washers to guarantee that the vane does not dislodge from the shaft in use, all of which adds to the complexity and expense of a vane valve.

It is known to form the shaft and vane as an integrated unit by molding of plastics, either by forming the shaft itself of a plastic or by overmolding a plastic vane onto a metal shaft. This approach eliminates the interface complexity of fasteners and lock washers between the shaft and the vane, thus reducing manufacturing cost, but at the same time creates new problems in valve assembly. The shaft, now carrying the vane, cannot be inserted directly into the bores in the body as was previously possible. In one known solution, the vane is formed in a slip fit on the shaft, permitting the shaft to be entered into the bores from within the valve passage; however, this approach requires that the vane be secured to the shaft by some means after the shaft is installed.

What is needed in the art is a simple and inexpensive method and apparatus for installing an integrated vane and shaft into a valve body.

It is a principal object of the present invention to simplify the assembly of a vane-type valve having an integrally formed shaft and vane.

SUMMARY OF THE INVENTION

Briefly described, a vane-type throttle valve assembly includes a body having a passage therethrough and a pivotable shaft transverse of the passage and supporting a vane for variably restricting the flow of material through the passage. The shaft is disposed in opposing bores in the valve body. Each bore has an access slot in communication with both the bore and the passage. The valve is assembled by inserting an integrated shaft and vane into the passage, engaging the ends of the shaft into the access slots, and translating the shaft ends in the access slots until the ends of the shaft are positioned in the bores. The shaft is retained in the bores by bushings inserted from outside the valve body. An end of the shaft may be engaged by any of various known means for control of the vane in use. In a currently preferred embodiment, the access slots are formed over an angle from an axis of the bores, and the shaft ends are entered into the bores through the slots by rotating the shaft and vane about the passage axis.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which.

DESCRIPTION OF THE PREFERRED EMBODIMENT

Figure 1:
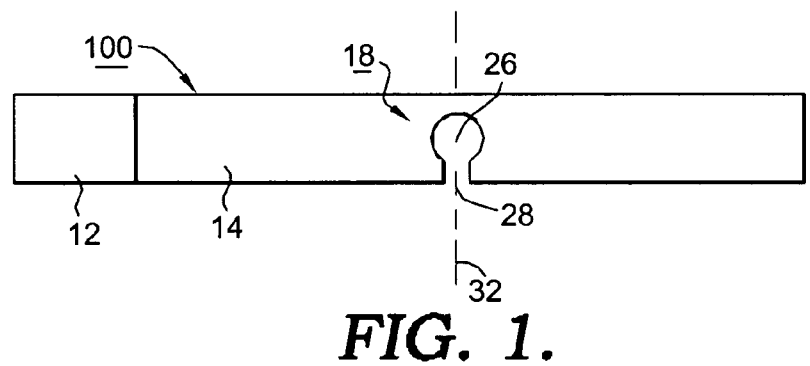
FIG. 1 is a plan view of a valve body in accordance with a first embodiment of the invention.

Referring to FIGS. 1–2, 5–6, and 8, a first embodiment 100 of a vane-type valve in accordance with the invention includes a base 12 and a valve body 14. Body 14 includes a passage 16 therethrough for flow of material (not shown). Body 14 defines a frame having first and second opposed bores 18 for receiving an integrated valve 20 comprising a shaft 22 and a vane 24. Valve 20 may be formed, for example, by overmolding a plastic vane onto a metal shaft in known fashion. Each of bores 18 comprises a cylindrical portion 26 having an axis 27, for accommodating the ends of shaft 22 in its functional position, and an accompanying slot 28 for guiding shaft 22 into portion 26 during assembly of the valve into the housing. Once shaft 22 is positioned in portion 26, cylindrical bushings 30 are inserted into portions 26 to capture the ends 23 of shaft 22. Because cylindrical portion 26 is larger in diameter than the width of slot 28, bushings 30 lock the ends of shaft 22 in portions 26 and prevent their return into slots 28. Optionally, at least one of bushings 30 may be close-fitting and non-rotational to shaft 22 and rotational to bore 18 and may be provided with a lever 31 for controlling the angle of vane 24 in passage 16.

Figure 2:
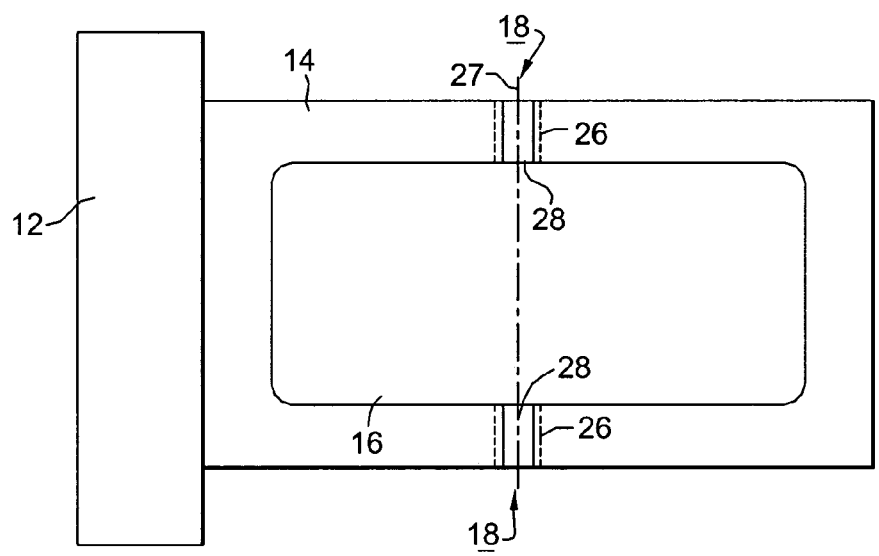
FIG. 2 is an elevational view of the valve body shown in FIG. 1.
Figure 3:
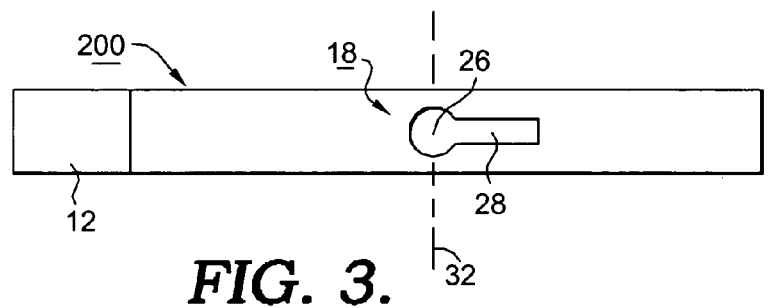
FIG. 3 is a plan view of a valve body in accordance with a second embodiment of the invention.
Figure 4:
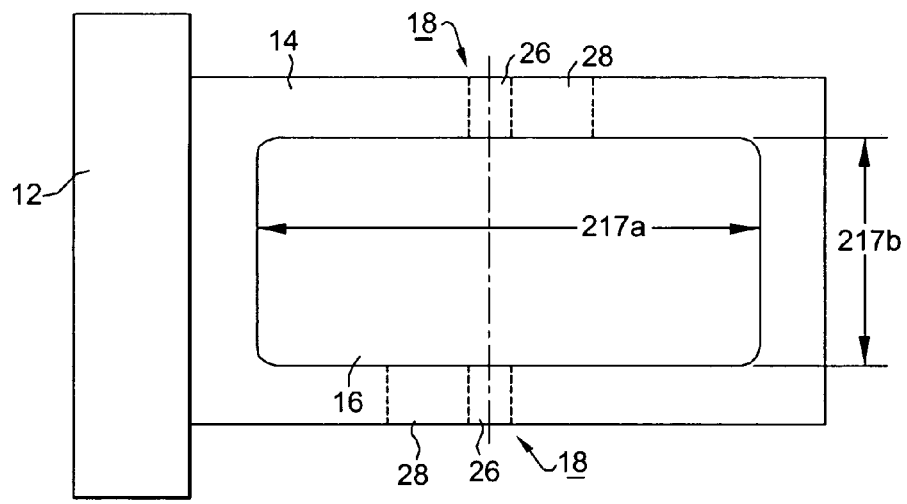
FIG. 4 is an elevational view of the valve body shown in FIG. 3.

In a method for assembling a first embodiment 100, as shown in FIGS. 1 and 2, slots 28 are aligned with the axis 32 of passage 16, and the valve assembly is formed by aligning the ends 23 of shaft 22 with slots 28, translating valve 20 axially of passage 16 to insert valve 20 into valve body 14, and inserting bushings 30 into portions 26. Because slots 28 are aligned longitudinally with passage axis 32, first embodiment 100 is useful with any cross-sectional shape for passage 16 and vane 24 and is not limited thereby.

Figure 5:
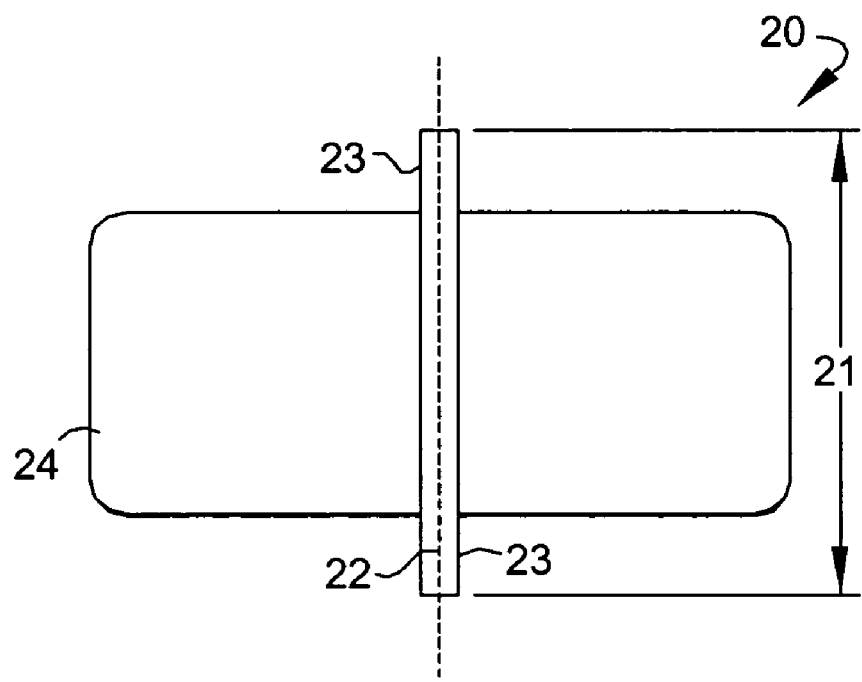
FIG. 5 is an elevational view of a shaft and vane for use with the valve body shown in FIGS. 3 and 4.
Figure 6:
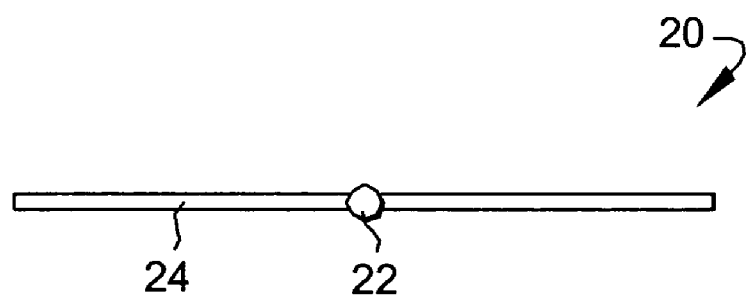
FIG. 6 is a plan view of the shaft and vane shown in FIG. 5.
Figure 7:
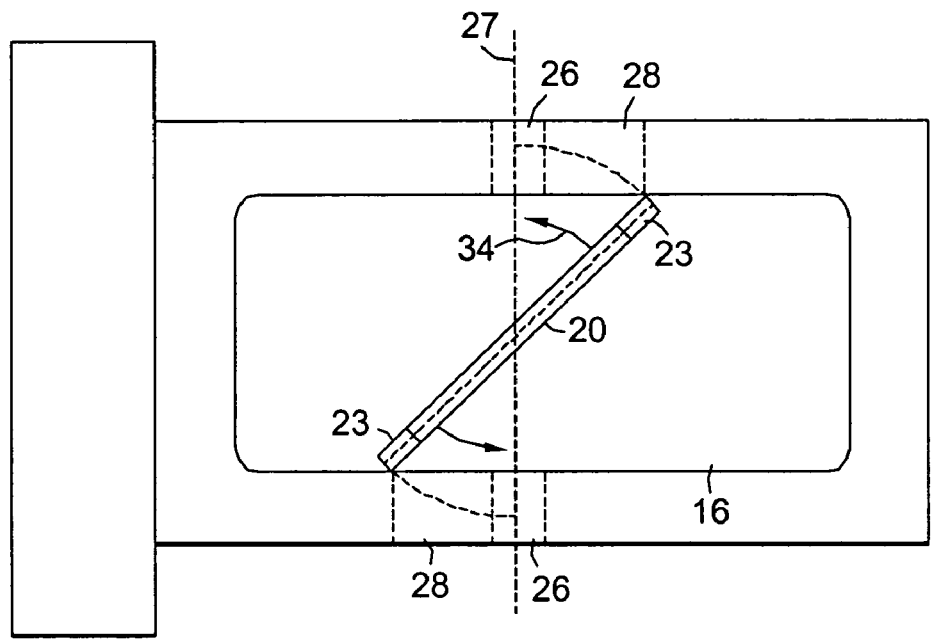
FIG. 7 is an elevational view showing the method of assembly of the shaft and vane shown in FIG. 6 into the valve body shown in FIGS. 3 and 4.
Figure 8:
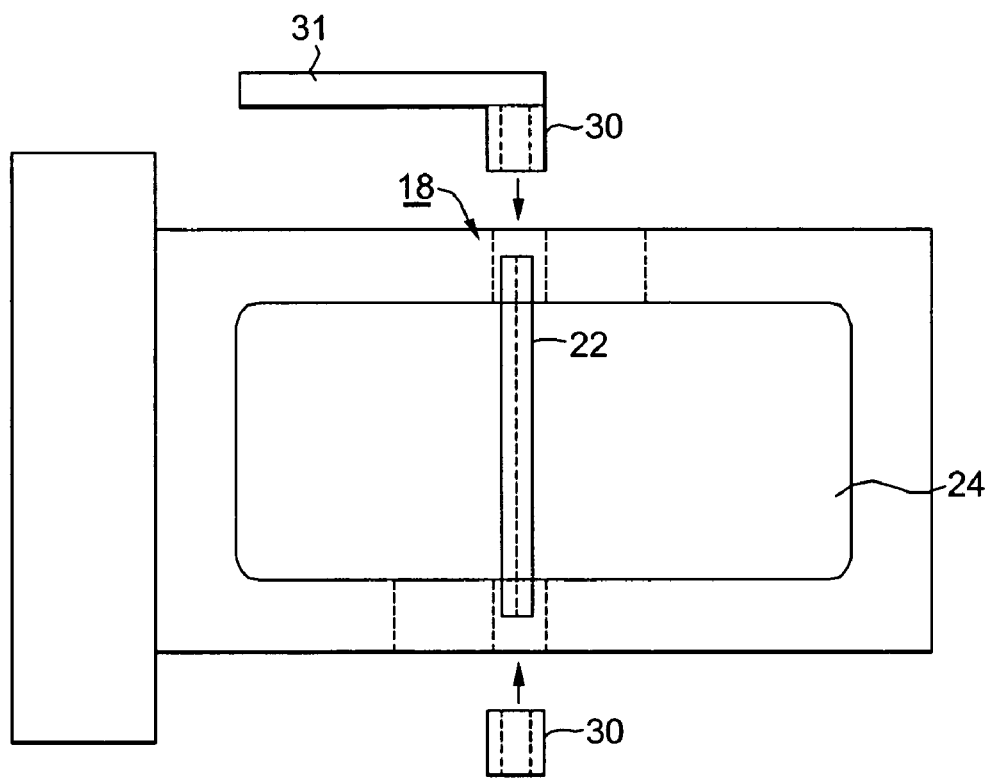
FIG. 8 is an elevational view showing the shaft and vane in final position in bores in the body.

Referring to FIGS. 3–8, a second embodiment 200 is similar to first embodiment 100 in having a base 12, a valve body 14, a passage 16 therethrough, and bores 18 including cylindrical portions 26. Valve 20 may be as shown in FIGS. 5 and 6. A distinction is that slots 28 in body 14 are longitudinally transverse of passage axis 32, and thus valve 20 cannot be inserted directly axially of the passage as in first embodiment 100. As shown in FIGS. 7 and 8, slots 28 open into passage 16 such that shaft 22 may enter passage 16 axially and engage the slots if the valve is first rotated through an angle 34 from bores axes 27. Once the slots are engaged, valve 20 is counter-rotated to bring the ends 23 of shaft 22 into portions 26. Bushings 30 are then inserted to lock the shaft in place as previously described for first embodiment 100.

Second embodiment 200 is useful only for non-cylindrical passages 16 as passage cross-sectional dimensions 217a,b greater than and less than the length 21 of shaft 22 are required. An advantage of embodiment 200 is that the valve body is stronger in having the slots formed transversely thereof, and further, the bushing is fully supported in the passage axial direction which is the direction of maximum stress in many valve applications.

Figure 9:
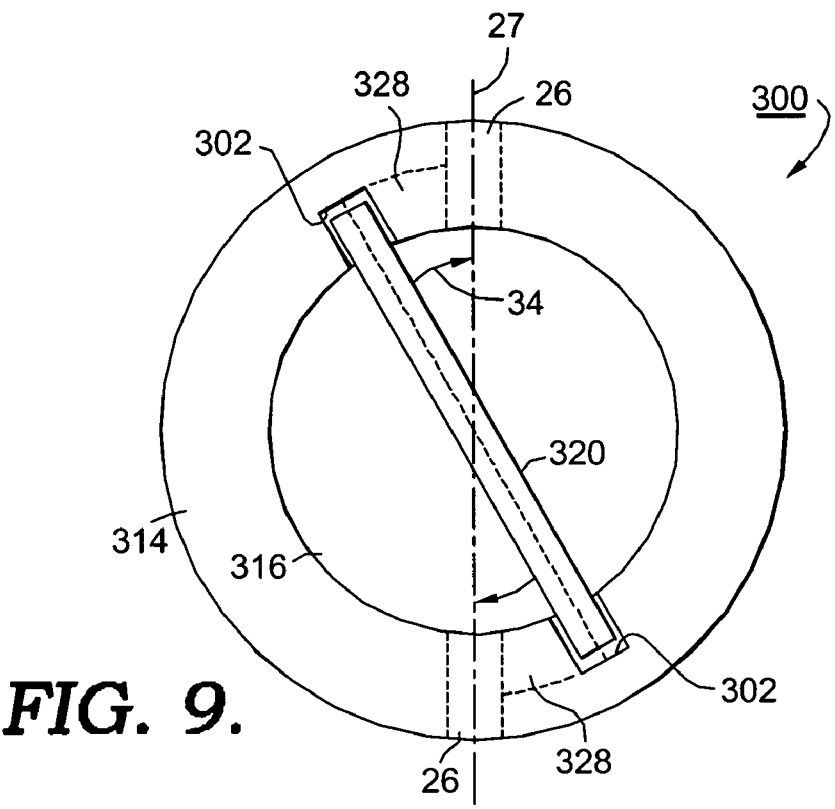
FIG. 9 is an elevational view showing the method of assembly of a shaft and vane into a valve body in accordance with a third embodiment of the invention.
Figure 10:
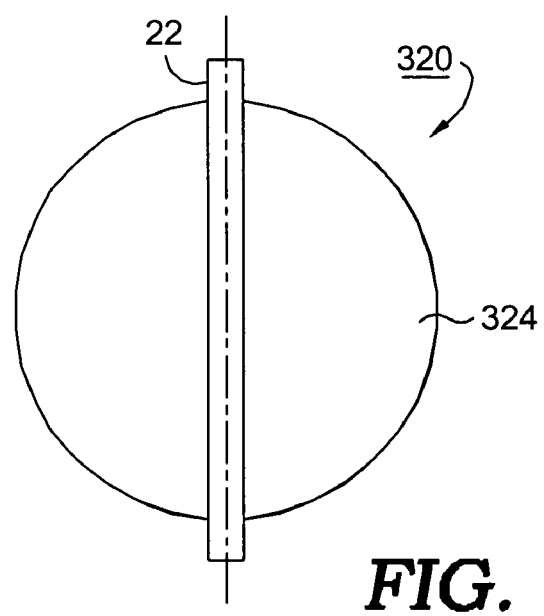
FIG. 10 is an elevational view of a shaft and vane shown in FIG. 9.

Referring to FIGS. 9 and 10, a third embodiment 300 comprises a valve body 314 having a cylindrical passage 316 therethrough and a valve 320 comprising a circular vane 324 on shaft 22. Because shaft 22 is longer than the diameter of passage 316, longitudinal access grooves 302 are provided in the walls of passage 316 connecting a longitudinal end of passage 316 with arcuate transverse slots 328. To assemble third embodiment 300, valve 320 is rotated through an angle 34 from bore axes 27 to engage access grooves 302. Once the access grooves are engaged, valve 320 is translated axially of passage 316 until slots 328 are engaged. Valve 320 is then counter-rotated to bring the ends of shaft 22 into portions 26. Bushings 30 are then inserted to lock the shaft in place as previously described.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A vane-type valve assembly comprising:
   a) a valve body having a passage therethrough, said passage having an axis, said valve body having first and second bores orthogonal to and extending into said passage and first and second slots in communication respectively with said first and second bores;
   b) a valve disposed in said passage, said valve having a shaft and a vane, first and second ends of said shaft being disposed respectively in said first and second bores such that rotation of said valve in said bores can vary the flow of material through said passage; and
   c) bushings for retaining said shaft in said bores,
   wherein said shaft ends are positioned into said first and second bores by entering said valve into said passage and passing opposed ends of said shaft through said first and second slots and wherein said bushings are received by said shaft ends and said first and second bores.

2. A valve assembly in accordance with claim 1 wherein said first and second bores are cylindrical and have a diameter greater than the widths of said first and second slots, and wherein said bushings have an outside diameter greater than said widths of said first and second slots.

3. A valve assembly in accordance with claim 1 wherein at least one of said bushings is non-rotational to said shaft.

4. A valve assembly in accordance with claim 3 wherein said at least one of said bushings includes a lever for controlling the rotational position of said vane in said passage.

5. A valve assembly in accordance with claim 1 wherein said first and second slots are formed longitudinally parallel with said passage axis.

6. A valve assembly in accordance with claim 1 wherein said first and second slots are formed longitudinally orthogonal to said passage axis.

7. A valve assembly in accordance with claim 6 wherein said passage is non-cylindrical and wherein said passage has transverse dimensions both greater than the length of said valve shaft and less than the length of said valve shaft.

8. A valve assembly in accordance with claim 6 wherein said passage is cylindrical, said vane is circular, and wherein said passage further comprises first and second access grooves formed in the walls of said passage in communication with said first and second access slots, respectively.

9. In a vane-type valve having a valve body having a passage therethrough and having first and second opposed bores extending into the passage and having first and second slots in communication with said first and second bores respectively and with said passage, a method for disposing in said passage a valve having a shaft and a vane, comprising the steps of:
   a) aligning opposed ends of said shaft with said first and second slots;
   b) passing said shaft ends through said slots and into said first and second bores, respectively; and
   c) entering retaining bushings into said first and second bores to retain said shaft ends in said bores.

10. A method in accordance with claim 9 wherein said slots are longitudinally aligned with an axis of said passage and wherein said passing step is in a direction axial of said passage.

11. A method in accordance with claim 9 wherein said slots are longitudinally transverse of an axis of said passage, and wherein said aligning step includes the step of rotating said shaft about said passage axis through an angle from the axes of said bores, and wherein said passing step is in a direction transverse of said passage and includes counter-rotation of said shaft about said passage axis.

* * * * *